(No Model.)
J. ALLIS.
APPARATUS FOR SUPPLYING WATER FOR ANIMALS.
No. 465,038. Patented Dec. 15, 1891.
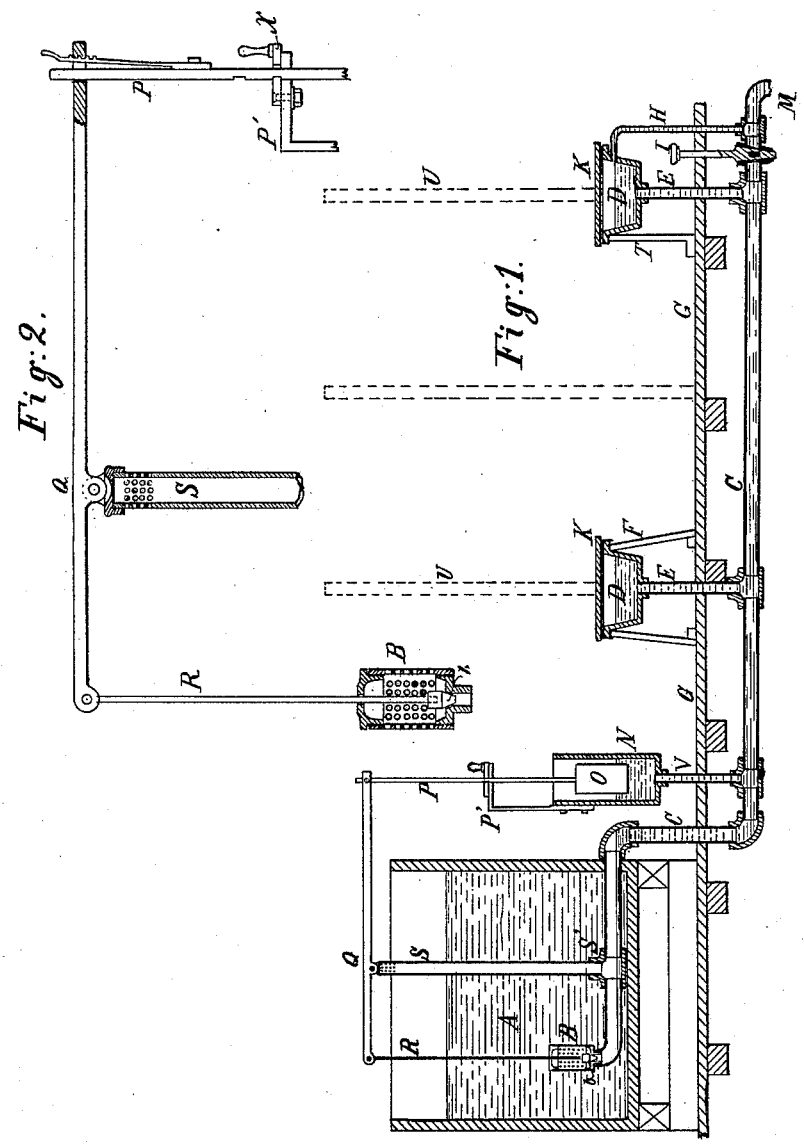

UNITED STATES PATENT OFFICE.

JOHN ALLIS, OF LOWVILLE, NEW YORK.

APPARATUS FOR SUPPLYING WATER FOR ANIMALS.

SPECIFICATION forming part of Letters Patent No. 465,038, dated December 15, 1891.

Application filed March 27, 1891. Serial No. 386,716. (No model.)

*To all whom it may concern:*

Be it known that I, JOHN ALLIS, a citizen of the United States, residing at Lowville, in the county of Lewis and State of New York, have invented certain Improvements in Apparatus for Supplying Water for Animals, of which the following is a specification.

My invention relates to certain apparatus for watering stock, the main portions of which are comprised in and constitute the elements of Patent No. 444,324, for "watering-trough for stock," issued to me and bearing date January 6, 1891, and of which invention the present application is for improvements in the construction for controlling the flow of water as it enters the main supply-pipe and by which such supply is governed and made self-regulating.

In the accompanying drawings, making part of this specification, Figure 1 is a vertical longitudinal section of the apparatus, and Fig. 2 an enlarged vertical section of the present improvement.

By reference to former patent, as above, it will be seen that the individual drinking-troughs D, with their supply-pipes E and the main pipe C, leading from the reservoir A, remain the same. The present improvement consists in carrying the pipe C farther into the reservoir (or spring) A and providing it with a T at the point S', into which is screwed the stand-tube S, the bottom of which opens into C and the top being carried above the highest surface of the water in the reservoir. The inner end of C is provided with an elbow opening upward, and attached to which is a perforated vertical cylinder B, which acts as a strainer and also as a retainer for a valve-block $b$. This valve-block may be of a conical or round vertical section and fitted into a corresponding seat in the upper end of the pipe C. The rod R, attached to the valve $b$, passes through a gallows cross-bar in the top of the cylinder B. The top of the pipe S is perforated for a little distance about the upper end and is provided with a cap, which is fashioned into a saddle-bearing for the lever Q, to which is attached the top end of the valve-rod R.

N is a vertical cylindrical tank open at the top and closed at the bottom, the latter being connected by a pipe V with the main C. This tank is placed near the reservoir A and on a horizontal line with the water-line of the troughs D, so that when the supply is turned on and water rises in the latter it will also rise in the pipe V and partially fill the cylinder N.

O is a cylindrical air-tight float nearly filling the vessel N and carrying the rod P, which passes through one end of the lever Q, being held in connection therewith by a ratchet-spring, which allows of vertical adjustment at will. Attached to and rising from the side of the tank N is a brace or stay $p'$, through which the rod P passes, and which is provided with a latch X, engaging in a corresponding notch in the side of P, so that the same may be held in position to disengage the valve $b$, or when turned to allow the float O and rod to be influenced by the water as it shall rise in the tank N.

U U are the partitions separating the animals, and so arranged that each trough shall accommodate the occupants of two adjoining stalls.

The troughs may be inclosed with curbing, as at F, or attached to the floor by the supporting-legs, as at T, or they may be secured to the front edge of the stall-partition by suitable ears cast upon the same and made fast with screws.

Operation: Allowing the several parts of the apparatus to be in place with their proper connections made, the rod P, with its attached float O, is raised until one of the notches will receive the latch X, which is turned so as to engage the same. Then the end of the lever Q, through which the top of P passes, is raised until the valve $b$ at the end of the rod R is pressed into its seat and held in place by the ratchet on the end of P. The reservoir A being filled and valve I closed, the latch X is withdrawn, thus allowing the float with its rod to drop, carrying with it the attached end of Q, which in turn lifts the rod R and valve $b$ and allowing the water to pass into the supply-pipe C, and thence into the vertical branches E and V. As the water rises in D and N it reaches the level of the orifice at the overflow-pipe H and passes off into the exit-pipe, the float O resting upon the surface of the water in the tank N. Now by a little adjustment of the ratchet-catch at the top of P it is easy to arrange the relative positions of the float O and valve $b$, so that as long as the level of the water in N and D remains at the height of the discharge at H the valve $b$ shall be pressed down into its seat and the supply thus cut off. Thus arranged the moment this level is disturbed or lowered by the drinking of an animal the float O drops, allowing the valve $b$ to open and the flow of water resumed, to be checked again when the level of the overflow is attained.

We will suppose it is desired to withdraw the water entirely from the troughs D and tank N. The latch X is turned into a notch in the rod P, which will cause the valve $b$ to press its seat firmly. Then upon turning the valve I the water in the troughs and tank N will subside through their respective pipes, passing out at M. The water, also, in the vertical part of the main pipe, as also that in the horizontal portion in the tank, will follow, proper vent for the pressure of the outside air being supplied through the perforations in the stand-pipe S, passing into the main at S'.

I am aware that a balanced valve arranged to be opened or closed by a float is by no means novel; but the special device of such a balanced valve, in combination with a vent tube and standard, as herewith shown, I believe to be heretofore unknown.

Therefore disclaiming any novelty in the arrangement of the general supply-pipe C with its branches E and their troughs D, as the same are shown in my previous patent above quoted, what I claim is—

1. In an apparatus for watering stock, the combination of the main supply-pipe G, provided with the branch pipes E and troughs connected therewith, said main pipe provided at one end with the drainage-valve I and at the other end with the valve $b$, a stand-pipe S, connected with the main pipe between said valves and perforated at the top thereof to allow for the ingress of air for the drainage of the main pipe and troughs when the valve I is opened, substantially as set forth.

2. In an apparatus for watering stock, the combination of the tank A, provided with the outlet-pipe, the stand-pipe S, perforated at the top thereof, the float-tank N, connected with the supply-pipe and provided with a float O, the lever Q, pivoted at the top of the perforated stand-pipe, and rods P and R, the float O and valve $b$, attached to said rods, said rod P being notched and adapted to engage with a latch, substantially as described.

JOHN ALLIS.

Witnesses:
J. C. HOUSE,
NETTIE A. PATRICK.